United States Patent
Suzuki

(10) Patent No.: US 7,819,536 B2
(45) Date of Patent: Oct. 26, 2010

(54) PROJECTOR LAMP UNIT WITH AIR AND LIGHT LEAKAGE PREVENTION

(75) Inventor: Masakazu Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 592 days.

(21) Appl. No.: 11/783,686

(22) Filed: Apr. 11, 2007

(65) Prior Publication Data

US 2007/0242453 A1    Oct. 18, 2007

(30) Foreign Application Priority Data

Apr. 12, 2006    (JP) .............................. 2006-109783

(51) Int. Cl.
*F21V 21/00*    (2006.01)
*G03B 21/14*    (2006.01)
(52) U.S. Cl. ...................... 353/119; 362/362
(58) Field of Classification Search ................. 353/119, 353/97, 98; 362/546–549, 262, 362, 368, 362/374, 375, 457
See application file for complete search history.

(56) References Cited

U.S. PATENT DOCUMENTS

| | | | |
|---|---|---|---|
| 6,731,076 B1 * | 5/2004 | Gerhard et al. | 315/289 |
| 2006/0001844 A1 | 1/2006 | Fukuda et al. | |

FOREIGN PATENT DOCUMENTS

| | | |
|---|---|---|
| GB | 2008333 A | 5/1979 |
| JP | 08264110 | 10/1996 |
| JP | 2000047327 | 2/2000 |
| JP | 2004-012827 | 1/2004 |

* cited by examiner

*Primary Examiner*—Thanh X Luu
(74) *Attorney, Agent, or Firm*—Pillsbury Winthrop Shaw Pittman, LLP

(57) ABSTRACT

With this projector, by forming in a lamp casing an aperture, for leading out a wire connected to an electrode terminal of a lamp, near that electrode terminal, and by fitting an insulating member which has an opening portion for leading out this wire, and a lid member which covers this opening portion, to this wire lead out aperture, even though the lamp casing is made from metal, still it is possible to ensure adequate clearances and creepage distances between the electrode terminal and the lamp casing. Furthermore it is possible to prevent light, or air which has been heated up, from leaking out from the wire lead out aperture.

2 Claims, 5 Drawing Sheets

PROJECTOR LAMP UNIT WITH AIR AND LIGHT LEAKAGE PREVENTION

CROSS REFERENCE

This Nonprovisional application claims priority under 35 U.S.C. §119(a) on Patent Application No. 2006-109783 filed in Japan on Apr. 12, 2006, the entire contents of which are hereby incorporated by reference.

BACKGROUND OF THE INVENTION

The present invention relates to a projector having a construction which prevents leakage of air which has been heated up by light from a lamp, or by heat generated by the lamp, from a wire lead out aperture which is provided in a lamp unit.

There is a per se known prior art projector which irradiates light from a lamp upon an image display device, such as a digital micro mirror device (DMD) or a liquid crystal display device, and which projects an image displayed upon this image display device upon a screen.

With this type of projector, the super high voltage mercury lamp which is used as the light source attains an extremely high temperature, due to generation of heat. Furthermore, it is necessary to keep the temperature of the lamp constant, in order to ensure that the lamp emits light at good efficiency. Thus, with a prior art projector, in order to cool the lamp with good efficiency, the lamp is housed in a lamp casing made from a plastic resin. And the lamp is cooled by impact of an air stream which is blown against the lamp from a fan.

Furthermore, with a prior art type projector, as described in Japanese Laid-Open Patent Publication 2004-12827, at least a portion of the lamp casing (lamp housing) is made from metal. And, in some cases, an air flow is furnished by the fan and flows along the metallic portion of the lamp housing.

In a prior art type projector, a wiring lead out aperture is provided in the lamp casing. And wiring connected to the electrical power terminals of the lamp is led out from this aperture, so that electrical power for illuminating the lamp may be supplied via this wiring. At this time, in order to prevent the covering of this wiring being softened or deteriorated by the heat of the lamp, normally, the aperture for bringing out the wiring is provided in the neighborhood of the electrode terminals of the lamp.

With a projector of the structure described above, as with the projection type display device described in Japanese Laid-Open Patent Publication 2004-12827, if the lamp case is made from metal, and the aperture for bringing out the wiring is provided in the neighborhood of the electrode terminals of the lamp, then it is necessary to ensure clearances and creepage distances and an adequate perpendicular distance between the lamp casing and the electrode terminals.

Furthermore, along with revision of the UL standard, for all of the plastic resin components used in the projector which are exposed to direct UV radiation from the lamp used as the light source, it is necessary to utilize a material which conforms to the standard for ultraviolet radiation resistance. Since, when light leaks out from the lamp casing (lamp housing), it strikes against the chassis of the projector or against peripheral components, accordingly it is necessary to utilize a plastic resin which conforms to the standard for ultraviolet radiation resistance for the chassis and these components as well.

However, such a plastic resin which conforms to the standard for ultraviolet radiation resistance is quite high in cost. Due to this, if such a plastic resin which conforms to the standard for ultraviolet radiation resistance is used for the chassis of the projector or for components thereof, the overall cost is increased. Furthermore, if a construction in which light can escape from the lamp casing is employed, then, since air which has been heated up by the heat of the lamp also leaks out, accordingly there is a fear that this hot air may apply heat to the chassis of the projector or to other components thereof, and may cause them to be softened or deformed.

The object of the present invention is to provide a projector which has a construction with which it is possible to ensure clearances and creepage distances between the lamp and the lamp casing, and with which light and air do not leak out from the wire lead out aperture of the lamp casing.

SUMMARY OF THE INVENTION

The projector according to the present invention includes a lamp unit having a lamp casing and a wire lead out aperture, the lamp casing covering the entire periphery of a lamp which has an electrode terminal, and the wire lead out aperture being formed upon said lamp casing near said electrode terminal, and allowing a wire connected to said electrode terminal is led out, the projector projecting light emitted from said lamp upon a screen; an insulating member fitted along the edge of said wire lead out aperture, surrounding around said electrode terminal, and having an opening portion for leading out said wire; and a lid member which covers said opening portion.

DETAILED DESCRIPTION OF THE INVENTION

Figure 1:
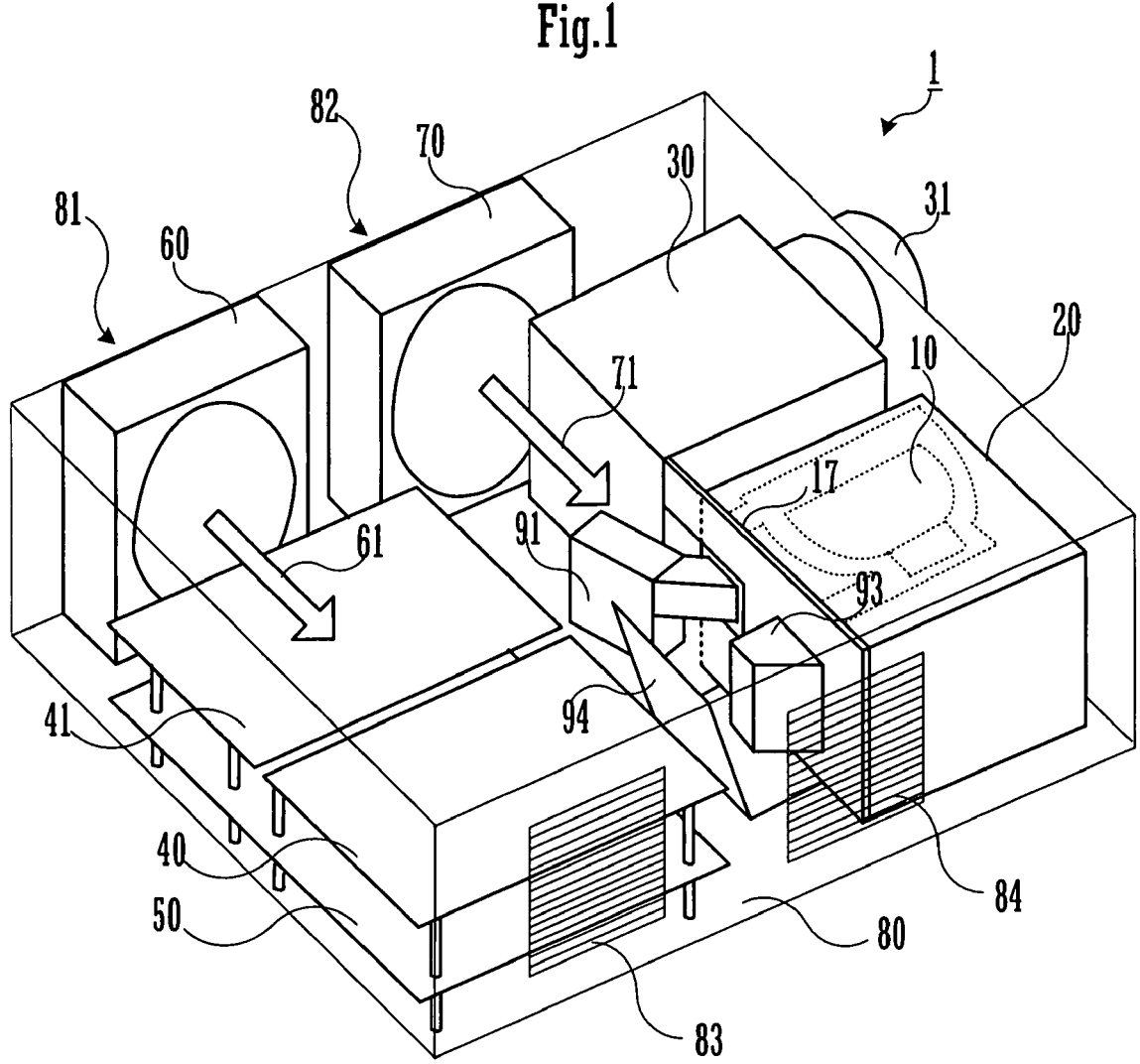
FIG. 1 is a perspective view, schematically showing the internal structure of a projector.

FIG. 1 is a perspective view, schematically showing the internal structure of a projector which is an embodiment of the present invention. This projector 1 comprises a lamp unit 10, an image projection unit 30, power supply boards 40 and 41, a control board 50, a main fan 60, and another main fan 70. Each of these is fitted to a chassis 80.

The lamp unit 10 emits light for image projection. Furthermore, the lamp unit 10 is housed in a lamp unit storage unit 20, and can be removed from the bottom surface of the main body of the projector 1.

The image projection unit 30 includes an image display device such as a DMD or the like and a color wheel, neither of which is shown in the figures. This unit 30 projects an image formed upon the image display device from a projection lens 31, using light from the lamp unit 10.

The power supply boards 40 and 41 supply power to the lamp unit 10 and so on. And the control board 50 controls the operation of the color wheel and the image formation device and so on (not shown in the figures) provided to the unit 30.

The main fans 60 and 70 are propeller fans, and are fitted in respective intake apertures 81 and 82, formed on one side of the chassis 80. These main fans 60 and 70 take in external air from their intake apertures 81 and 82 and exhaust it from exhaust apertures 83 and 84 which are formed on the opposite side of the chassis 80. By doing this, the interior of the projector 1 is air cooled.

Furthermore, this projector 1 comprises an intake fan 91 for air cooling the lamp unit 10. This intake fan 91 sucks in air which has been blown by the man fans 60 and 70 into the interior of the projector main body, and cools a lamp which is provided within the lamp unit 10. The air which is discharged from an exhaust aperture 93 of the lamp unit 10 strikes a partition plate 94, and is then discharged to the exterior of the projector main body by the main fans 60 and 70.

Figure 2:
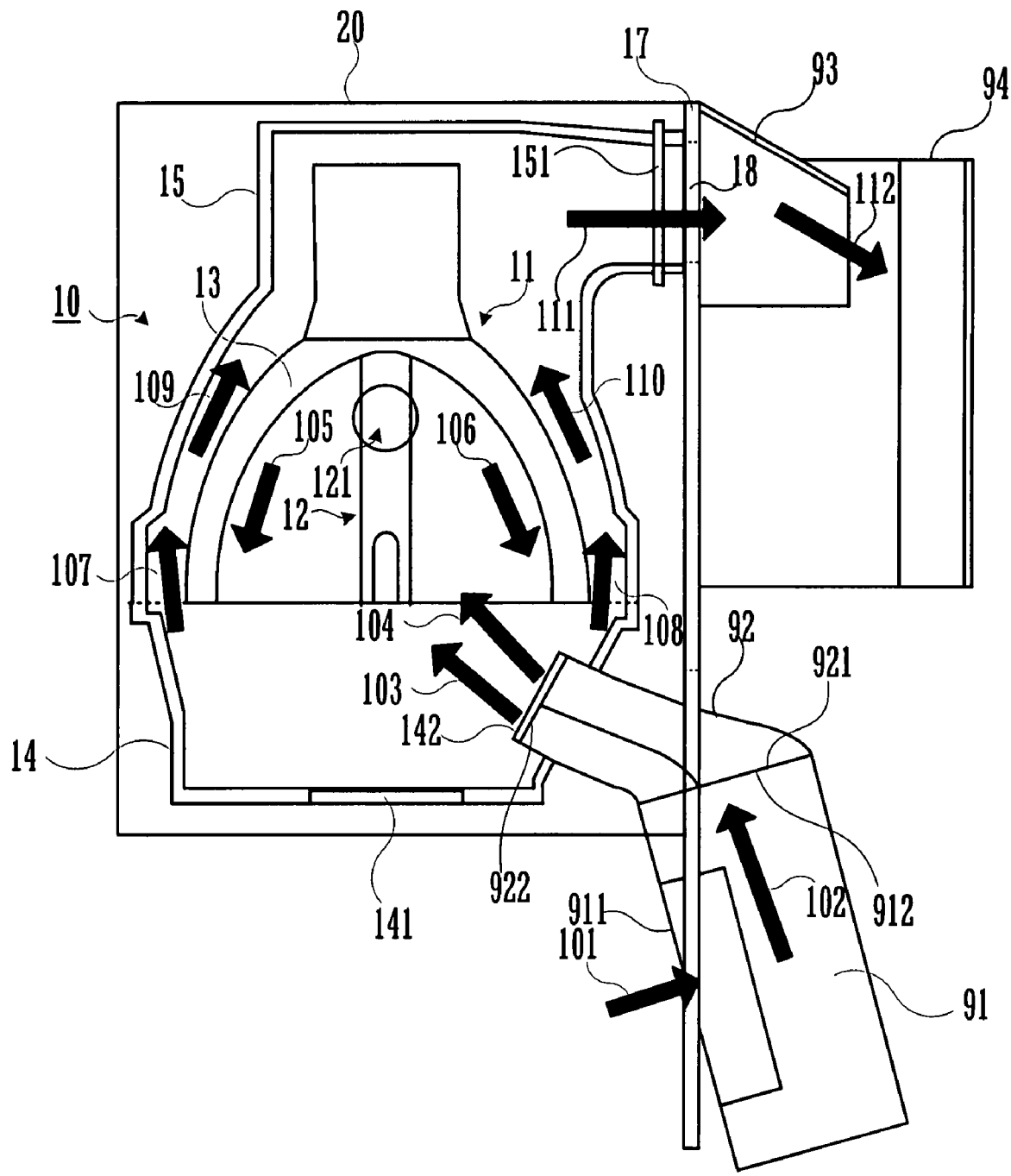
FIG. 2 is a cutaway plan view showing the general structure of a lamp unit thereof.

FIG. 2 is a cutaway plan view showing the general structure of the lamp unit 10 and its surroundings. As shown in FIG. 2, this lamp unit 10 comprises a lamp 11 having a lamp bulb 12 and a reflector 13, a front cover 14, a rear cover 15, wires not shown in the figures which supply electrical power to the lamp bulb 12, and so on.

As described above, the lamp unit 10 is stored in the lamp unit storage unit 20. The front cover 14 and the rear cover 15 of the lamp unit 10 are sealed thereto, so that air does not leak from the junction portions. The front cover 14 and the rear cover 15 are made from aluminum.

The front cover 14 has a projection aperture 141 through which light is projected from the lamp bulb 12, and an intake aperture 142 for air cooling the lamp 11. This front cover 14 is fitted to the front side of the lamp 11.

And the rear cover 15 has an exhaust aperture 151 for discharging air which has cooled the lamp bulb 12. Moreover, this exhaust aperture 151 is connected with an exhaust aperture 18 which is formed in a wall 17 of the lamp unit storage unit 20. This rear cover 15 is fitted to the rear side of the lamp 11.

Furthermore, an intake fan 91 and a duct 92 are fitted to the lamp unit 10. The intake fan 91 is a sirocco type (multi-bladed) fan, and an exhaust aperture 912 thereof is joined to an intake aperture 921 of the duct 92. Moreover, an exhaust aperture 922 of the duct 92 is joined to the intake aperture of the front cover 14 of the lamp unit 10. Yet further, the duct 92 and the intake aperture 142 of the front cover 14 are arranged in a configuration to blow air towards the lamp bulb 12.

With the present invention having the structure described above, it is possible for air which the intake fan 91 has taken in from its intake aperture 911 to be blown against the lamp bulb 12 of the lamp 11 directly from its front, so that the lamp bulb 12 may be cooled thereby. In other words, the lamp bulb 12 is cooled by a flow of air as shown by the black arrow signs 101~112 in FIG. 2. First, air which has been sucked in from the intake aperture 911 of the intake fan 91 is blown in from the intake aperture 142 of the front cover 14 of the lamp unit 10 towards the lamp bulb 12 therein (as shown by the black arrows 101~104). This air which is blown against the lamp bulb 12 cools the lamp bulb 12. And, after having been blown against the lamp bulb 12, this air passes along the vicinity of the inner surface of the reflector 13, then passes between the rear cover 15 and the reflector 13, and is subsequently exhausted from the exhaust aperture 151 (as shown by the black arrows 105~112).

Figure 3A:
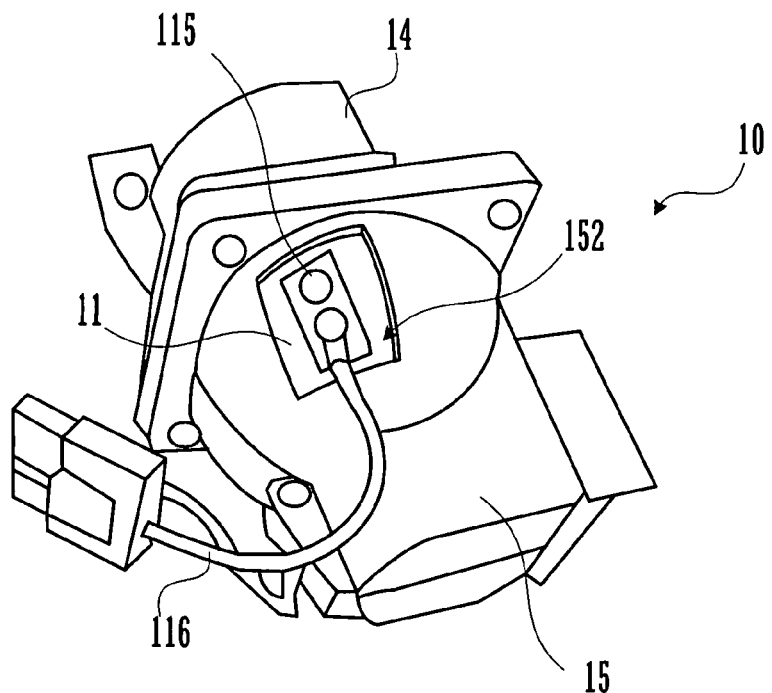
FIG. 3A is a perspective view showing a wire lead out aperture of the lamp unit.
Figure 3B:
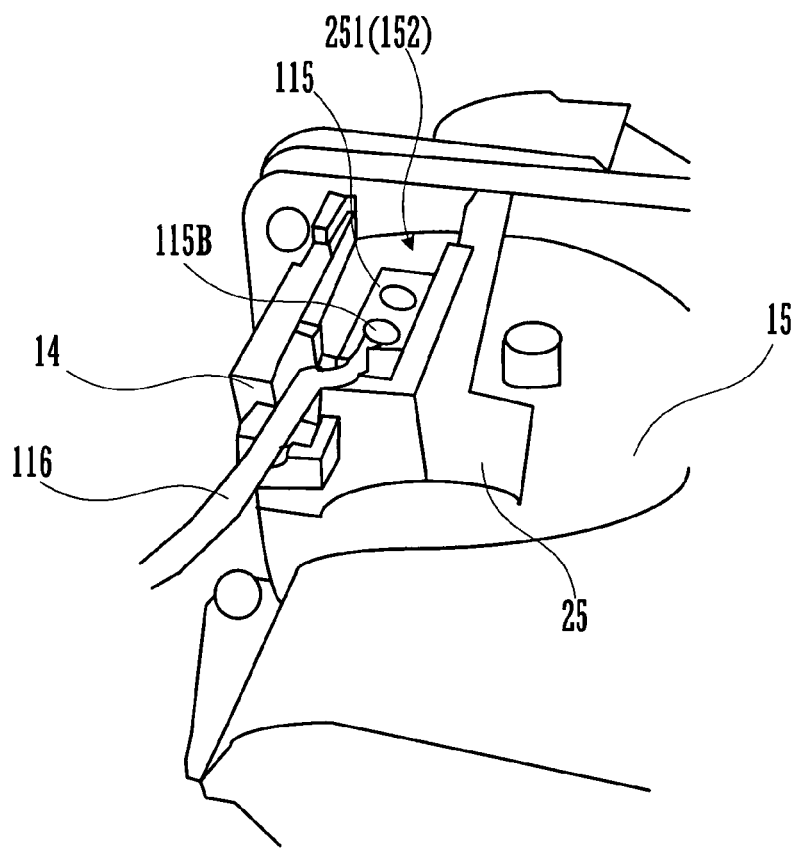
FIG. 3B is a perspective view showing a state in which an insulating cover is fitted to this wire lead out aperture.
Figure 4:
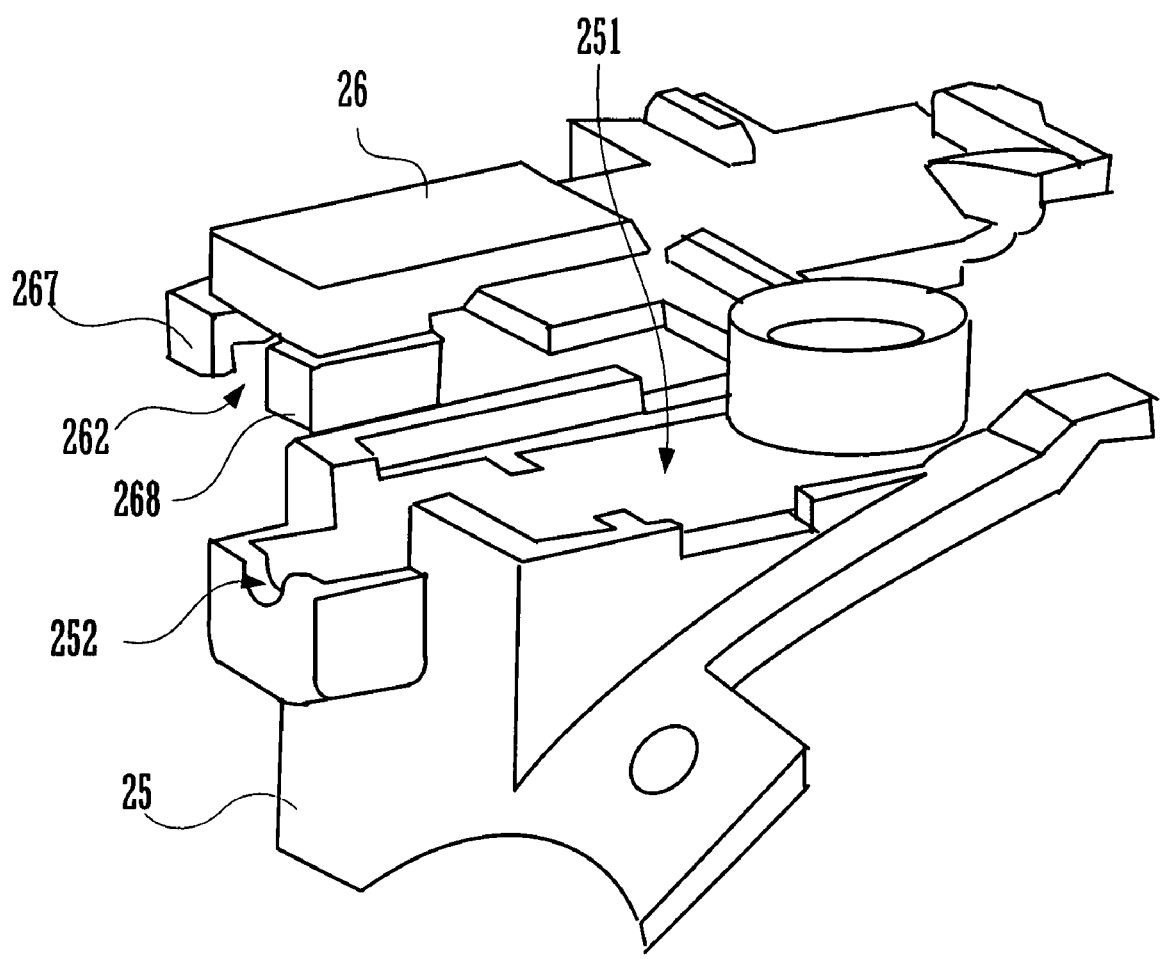
FIG. 4 is a perspective view showing the shapes of the insulating cover and of a lid.

FIG. 3A is a perspective view showing a wire lead out aperture of the lamp unit 10. And FIG. 3B is a perspective view showing a state in which an insulating cover is fitted to this wire lead out aperture. Moreover, FIG. 4 is a perspective view showing the shapes of the insulating cover and of a lid. When the electrode terminals 115 are installed on the side of the lamp 11, as shown in FIG. 3A, the wire lead out aperture 152 is positioned upon the rear casing 15 of the lamp unit 10, so as to oppose the electrode terminals 115. Due to this, it becomes possible for the wiring 116 not to be led out within the rear cover 15 between the lamp 11 and the rear cover 15, and thereby it is possible to prevent deterioration of the covering of the wiring 116 due to the heat of the lamp.

As described above, since the front cover 14 and the rear cover 15 are made from aluminum, if the wire lead out aperture 152 is provided in the vicinity of the electrode terminals 115 of the lamp 11, it is necessary to guarantee clearances and creepage distances between them. Thus with the present invention, as shown in FIG. 3B, an insulating cover 25 is fitted along the edge of the wire lead out aperture 152, so as to surround the electrode terminals 115. An opening portion 251 is formed in this insulating cover 25, for actuating the screws 115B of the electrode terminals 115 of the lamp 11, and for leading out the wiring 116 which is fitted to these electrode terminals 115.

By fitting the insulating cover 25 to the wire lead out aperture 152 in this manner, it becomes possible to ensure a good clearances and good creepage distances between the electrode terminals 115 and the rear cover 15, so that it becomes possible to obtain good electrical insulation.

It should be understood that there is a possibility that the light, including ultraviolet light, which is emitted from the lamp 11 through the wire lead out aperture 152, may strike the insulating cover 25. Due to this, a plastic resin component which fulfils the standard for ultraviolet resistance is used for the insulating cover 25.

Furthermore, with the present invention, as shown in FIG. 4, a lid 26 is fitted to the opening portion 251 of the insulating cover 25, so as to cover it over. In other words, the entire wire lead out aperture 152 is covered over by the insulating cover 25 and the lid 26. Accordingly, it is possible to prevent the light from the lamp 11, and the air which has been heated up by the heat generated by the lamp 11, from leaking out from the wire lead out aperture 152.

It should be understood that there is also a possibility that the light, including ultraviolet light, which is emitted from the lamp 11 through the wire lead out aperture 152, may strike the lid 26. Due to this, a plastic resin component which fulfils the standard for ultraviolet resistance is used for the lid 26. Furthermore, when the lid 26 is fitted to the insulating cover 25, it is fixed by screws through screw holes provided in the lid 26.

Figure 5:
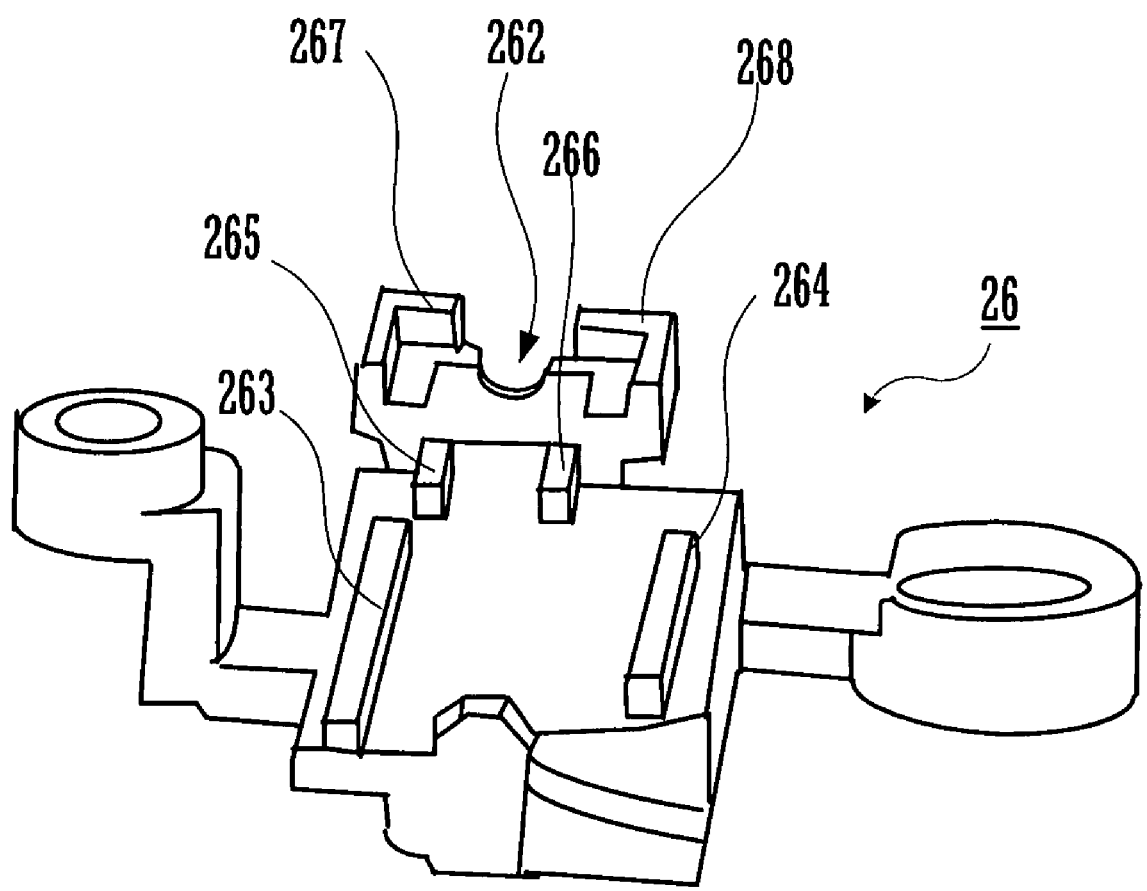
FIG. 5 is a perspective view showing ribs and flanges provided upon this lid.

FIG. 5 is a perspective view showing ribs and flanges provided upon this lid 26. Next, with the present invention, as shown in FIGS. 3B and 4, wiring 116 which supplies electrical power to the lamp 11 is led out from between a cutaway portion 252 provided in the insulating cover 25 and a cutaway portion 262 of the lid 26. However, if this method of leading out the wiring is employed, when the lamp unit 10 is housed in the lamp unit storage unit 20 and the wiring 116 is bent around, sometimes a force is imposed from the wiring 116 upon the cutaway portion 262 of the lid 26 so as to press it upwards. In this case, there is a danger that a gap will be opened up between the insulating cover 25 and the lid 26, which would be undesirable, or that light from the lamp 11 or air which has been heated up by the heat generated by the lamp 11 may leak out.

Accordingly, with the present invention, as shown in FIG. 5, ribs 263~266 are provided upon the lid 26, adjacent to the portion thereof which is contacted by the border of the opening portion 251 of the insulating cover 25. Furthermore, flanges 267 and 268 are provided upon the lid 26, and, when the lid 26 is fitted to the insulating cover 25, these flanges cover the mutually contacting portions of the insulating cover 25 and the lid 26 (in FIG. 5, there is shown an example in which these flanges are provided at the periphery between the cutaway portion 252 provided to the insulating cover 25 and the cutaway portion 262 of the lid 26). In the state in which the lid 26 is fitted to the insulating cover 25, the ribs 263~266 contact against the inner wall of the insulating cover 25. Moreover, the flanges 267 and 268 contact against the outer wall of the insulating cover 25.

Here, the heights of the ribs 263~266 and the heights of the flanges 267 and 268 should be made to be such heights as can keep any gap between the insulating cover 25 and the lid 26 closed, even if a pressing upwards force is imparted from the wiring 116 upon the lid 26; the values for these heights may be determined by experimentation.

By employing a structure like the one described above, even if a pressing upward force should be imparted from the wiring 116 to the lid 26, so that the end portion of the lid 26 becomes separated from the insulating cover 26, and a gap appears between the insulating cover 25 and the lid 26, still it is possible to keep this gap closed with the ribs 263~266 and the flanges 267 and 268. Accordingly, it is possible to prevent light from the lamp 11, or air which has been heated up by heat generated by the lamp 11, from escaping from between the insulating cover 26 and the lid 26.

It should be understood that it would also be possible to form ribs along the entire extent of the portion of the lid 26 which contacts the insulating cover 25, or to provide a flange so as to cover the entire external circumference of the insulating cover 25.

Finally, in the above described explanation of an embodiment of the present invention, all of the features are shown by way of example, and should not be considered as being limitative of the present invention. The scope of the present invention is not to be defined by any of the features of the embodiment described above, but only by the scope of the appended Claims. Moreover, equivalents to elements in the Claims, and variations within their legitimate and proper scope, are also to be considered as being included within the range of the present invention.

What is claimed is:

1. A lamp unit for a projector comprising:
    a lamp provided with an electrode terminal on a side thereof;
    a wire, connected to the electrode terminal, that is configured to supply electrical power to the lamp;
    a lamp casing made of metal configured to cover an entire periphery of the lamp, the lamp casing having, over the electrode terminal, a wire lead out aperture for leading out the wire;
    an insulating cover made of plastic resistant to ultraviolet light, the insulating cover being fitted along an edge of the wire lead out aperture, and surrounding around the electrode terminal; and
    a lid member made of plastic resistant to ultraviolet light, the lid member covering the insulating cover, the lid member having a convex rib and a flange, the convex rib coming in contact with an inner periphery of the insulating cover, the flange coming in contact with an outer periphery of the insulating cover.

2. A projector comprising:
    a lamp unit provided with lamp having an electrode terminal on a side thereof;
    a wire, connected to the electrode terminal, that is configured to supply electrical power to the lamp;
    a lamp casing made of metal configured to cover an entire periphery of the lamp, the lamp casing having, over the electrode terminal, a wire lead out aperture for leading out the wire;
    an insulating cover made of plastic resistant to ultraviolet light, the insulating cover being fitted along an edge of the wire lead out aperture, and surrounding around the electrode terminal; and
    a lid member made of plastic resistant to ultraviolet light, the lid member covering the insulating cover, the lid member having a convex rib and a flange, the convex rib coming in contact with an inner periphery of the insulating cover, the flange coming in contact with an outer periphery of the insulating cover.

* * * * *